(12) United States Patent
Tarter

(10) Patent No.: US 10,841,720 B1
(45) Date of Patent: Nov. 17, 2020

(54) PUBLIC ADDRESS PAUSE MODULE

(71) Applicant: ASTRONICS CONNECTIVITY SYSTEMS & CERTIFICATION CORP., Waukegan, IL (US)

(72) Inventor: Eric Tarter, Carlsbad, CA (US)

(73) Assignee: ASTRONICS CONNECTIVITY SYSTEMS & CERTIFICATION CORP., Waukegan, IL (US)

( * ) Notice: Subject to any disclaimer, the term of this patent is extended or adjusted under 35 U.S.C. 154(b) by 0 days.

(21) Appl. No.: 16/565,107

(22) Filed: Sep. 9, 2019

(51) Int. Cl.
| | | |
|---|---|---|
| *H04R 29/00* | (2006.01) | |
| *G06F 3/16* | (2006.01) | |
| *H04N 21/214* | (2011.01) | |
| *H04R 27/00* | (2006.01) | |
| *H04W 4/80* | (2018.01) | |
| *H04R 3/00* | (2006.01) | |

(52) U.S. Cl.
CPC .......... *H04R 29/007* (2013.01); *G06F 3/165* (2013.01); *H04N 21/2146* (2013.01); *H04R 3/00* (2013.01); *H04R 27/00* (2013.01); *H04R 29/008* (2013.01); *H04R 2499/13* (2013.01); *H04W 4/80* (2018.02)

(58) Field of Classification Search
CPC ........ H04R 29/007; H04R 3/00; H04R 27/00; H04R 29/008; H04R 2499/13; G06F 3/165; H04N 21/2146; H04W 4/80
See application file for complete search history.

(56) References Cited

U.S. PATENT DOCUMENTS

| | | | | |
|---|---|---|---|---|
| 5,973,722 A | * | 10/1999 | Wakai | H04H 20/62 725/106 |
| 8,094,949 B1 | * | 1/2012 | Rhoads | H04N 1/00424 382/232 |
| 2011/0162015 A1 | * | 6/2011 | Holyoake | H04N 7/18 725/76 |
| 2017/0164192 A1 | * | 6/2017 | Schussmann | H04W 12/04 |
| 2019/0020923 A1 | * | 1/2019 | Joye | H04N 21/47217 |

* cited by examiner

*Primary Examiner* — Regina N Holder
(74) *Attorney, Agent, or Firm* — Pauley Erickson & Swanson

(57) ABSTRACT

A system and method for use of a public address pause module with an onboard entertainment system of an aircraft cabin. The module includes a connector for connecting the module to an aircraft public address speaker and an audio detection circuit connected with respect to the connector. A micro controller unit is connected with respect to the audio detection circuit to determine whether a measured voltage of the public address speaker exceeds a pre-set threshold for a pre-determined time period and to generate a pause signal. A wireless transmitter communicates the pause signal to the onboard entertainment system thereby pausing the onboard entertainment system during onboard use of the public address speaker.

14 Claims, 4 Drawing Sheets

| Molex PN: 39-30-0080 ||
|---|---|
| Pin No. | Signal Description |
| J1-1 | 28 VDC In |
| J1-2 | 28 VDC Out |
| J1-3 | DC Ground In |
| J1-4 | DC Ground Out |
| J1-5 | Signal In |
| J1-6 | Signal Out |
| J1-7 | Common In |
| J1-8 | Common Out |

FIG. 4

PUBLIC ADDRESS PAUSE MODULE

FIELD OF THE INVENTION

This invention relates generally to a public address pause module for use in an aircraft cabin.

BACKGROUND OF THE INVENTION

Most commercial airlines provide onboard entertainment systems including audio, video, and wireless internet access to their passengers. Such onboard entertainment systems are capable of distributing movies, television, internet access and/or music throughout an aircraft cabin for use on seatback monitors, seat installed audio jacks, and/or passengers' personal electronic devices. Portable entertainment systems are commercially available, including the SIERRA™ system by Astronics that enable an airline or aircraft owner to quickly and easily retrofit an aircraft to include such onboard entertainment systems. However, such retrofittable systems and even some existing legacy systems may not account for onboard programming or announcements that are necessary before, during and after a commercial flight. Such announcements may include safety briefing, time, weather and gate information, and/or other realtime information that is helpful or critical for passengers to hear without interruption or simulcast of the onboard entertainment. As such, there is a need for a system for airlines to pause entertainment systems during onboard announcements.

SUMMARY OF THE INVENTION

The present invention provides a system and method for incorporating a module into an aircraft to pause onboard entertainment systems during onboard public address announcements. The present invention is preferably adaptable to existing aircraft and existing onboard entertainment systems without substantial modifications to existing aircraft infrastructure.

According to a preferred embodiment of the subject invention, a public address pause module includes a connector for connecting the module to an existing cable assembly of the aircraft. An audio detection circuit is connected with respect to the connector and operates in concert with a micro controller unit to determine whether a measured voltage of the public address speaker exceeds a pre-set threshold for a pre-determined time period and to generate a pause signal. A wireless transmitter is configured within the module to communicate the pause signal to the onboard entertainment system. As a result, streaming audio and video content from the onboard entertainment system is paused during crew announcements over the aircraft public address system Other objects and advantages will be apparent to those skilled in the art from the following detailed description taken in conjunction with the claims and drawings.

BRIEF DESCRIPTION OF THE DRAWINGS

FIG. 4 shows an external connector interface of a public address pause module according to one embodiment.

DETAILED DESCRIPTION OF THE INVENTION

The present invention provides a system and method for pausing an onboard entertainment system 40 in an aircraft cabin. For ease of explanation, the following description will generally refer to wired, Wi-Fi™ and/or Bluetooth wireless onboard entertainment systems 40 that are provided to individual seat back or personal device entertainment stations, called passenger service units (PSU). It should be understood that the system and method of this invention may be used with any type of wired or wireless local area network systems.

Figure 1:
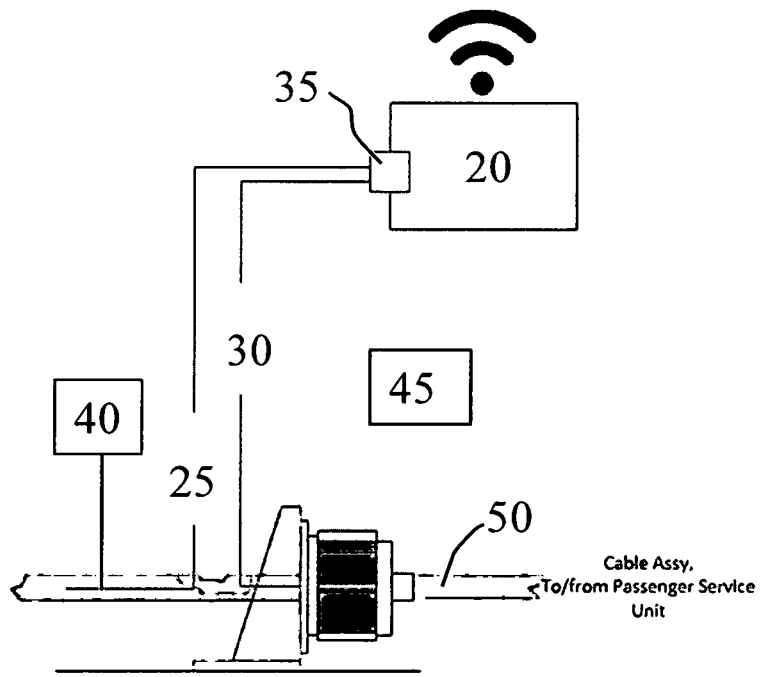
FIG. 1 shows a schematic of a public address pause module connected within an aircraft.

FIG. 1 shows a schematic of one embodiment of a public address pause module (also called "the module" herein) 20 as incorporated into an aircraft. The public address pause module 20 is preferably used in connection with an onboard entertainment system 40 of an aircraft cabin. Such onboard entertainment systems 40 stream movies, television, music, flight information and other content to passengers.

Figure 2:
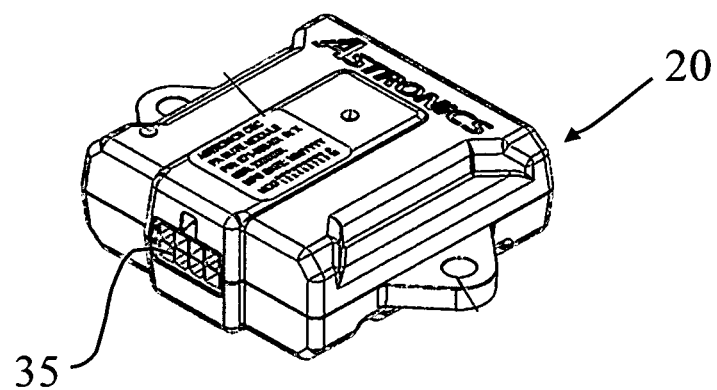
FIG. 2 shows a front perspective drawing of a public address pause module according to one embodiment.
Figure 3:
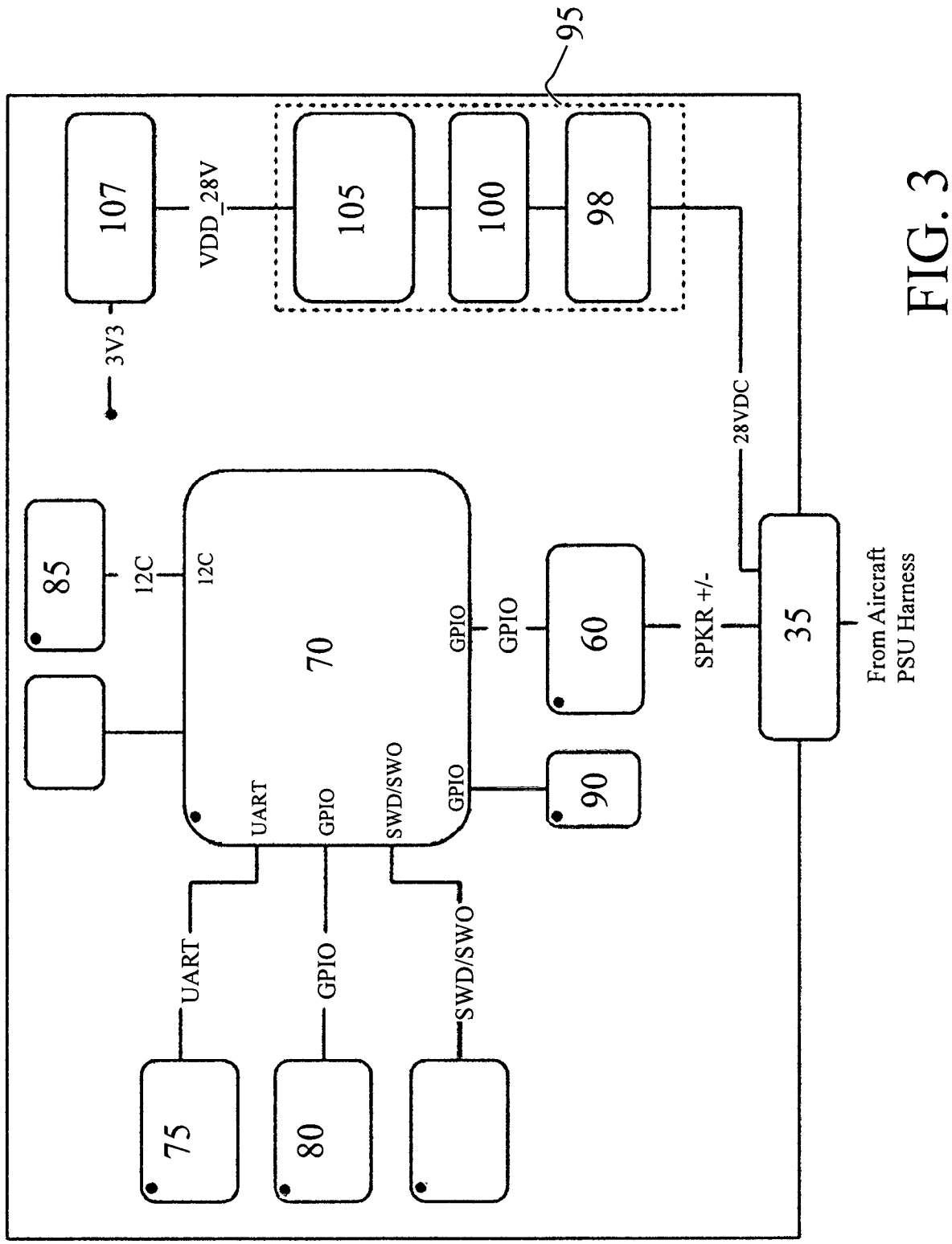
FIG. 3 shows a block diagram of a public address pause module according to one embodiment.

The module 20 according to one embodiment is shown in a physical embodiment in FIG. 2 and schematically in FIG. 3. The module 20 preferably includes a connector 35 for connecting the module 20 to an existing cable assembly of the aircraft. Preferably, the connector 35 connects the module to an aircraft public address speaker 45 through an analog audio wire having audio in 25 and audio out 30 and a 28V power line 50 of the aircraft. More specifically, the public address pause module 20 may be connected through the connector 35 to an aircraft power bus. FIG. 4 shows one preferred embodiment of an external connector interface of the public address pause module 20.

In addition, an audio detection circuit 60 is connected with respect to the connector 35. The audio detection circuit 60 preferably operates in concert with a micro controller unit 70 to determine whether a measured voltage of the public address speaker 45 exceeds a pre-set threshold for a pre-determined time period and to generate a pause signal. According to a preferred embodiment, the micro controller unit 70 comprises a Nordic BLE module which is a Bluetooth 5-ready low energy system on chip. By maintaining a time period threshold, the subject invention prevents pauses in speech patterns or announcements from switching the output of the audio detection circuit 60.

Figure 5:
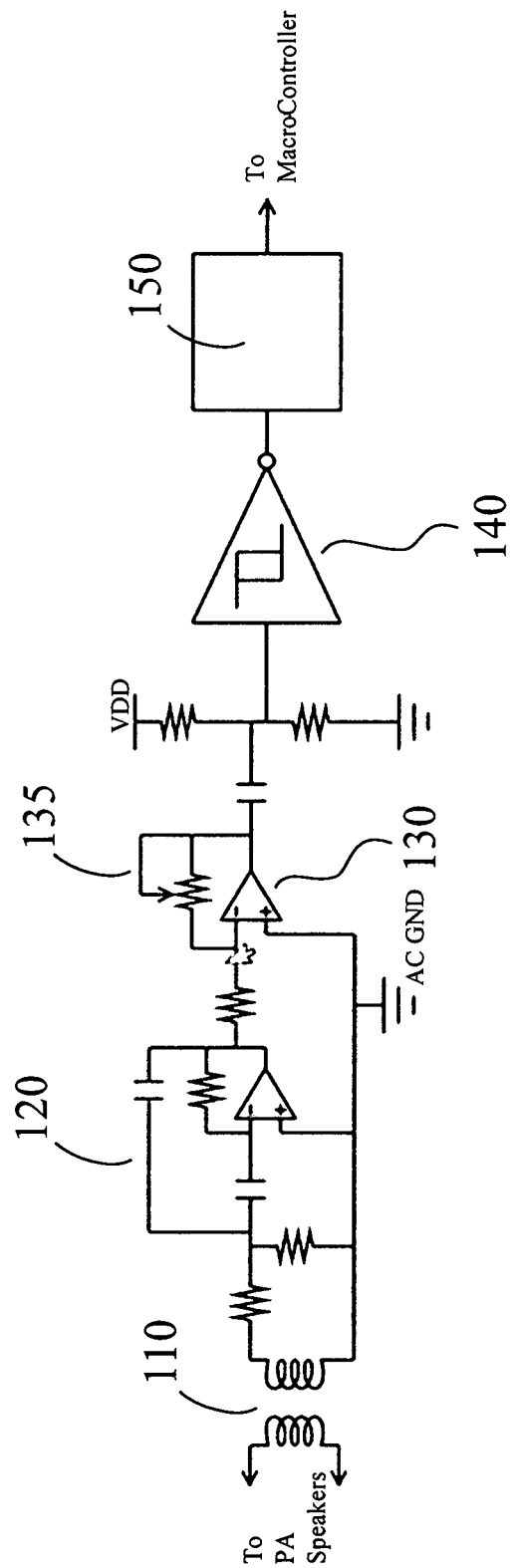
FIG. 5 shows a circuit diagram of an audio detection circuit of a public address pause module according to one embodiment.

FIG. 5 shows one preferred embodiment of the audio detection circuit 60. In this embodiment, an audio signal from the public address speaker 45 is isolated with a transformer 110, and passed to an active bandpass filter 120. The signal is then passed to a programmable gain amplifier 130 using a digital potentiometer 135. This new signal is sent to be quantized via a Schmitt trigger 140 that is biased above its upper threshold; a signal must be larger than the threshold offset plus the hysteresis width to cause a change of output. The output of the Schmitt trigger 140 then goes to a debouncer 150 that will hold its output active even if the signal is below the threshold for a set pre-determined period of time, for instance 5 seconds. The pre-determined time period accommodates pauses in speech and/or music playback from the public address system.

Referring again to FIG. 3, a wireless transmitter 75 is configured within the module 20 to communicate the pause signal to the onboard entertainment system 40. Upon receipt of the pause signal, the onboard entertainment system 40 preferably freezes all additional transmission of content and access until such as time as the measured voltage is below the pre-set threshold for a pre-determined time period. The public address pause module 20 may include a digital pot or similar means of adjustment of the pre-set threshold and/or the pre-determined time period to account for variances in aircraft type.

The public address pause module 20 is preferably positioned proximate to the onboard entertainment system 40. In preferred embodiments, the module 20 is placed in the aircraft cabin for autonomous operation within 10 feet of the onboard entertainment system 40, such as the Astronics SIERRA portable server unit, to minimize installation time and optimize RF transmissions between devices.

The public address pause module 20 may further include one or more integrated status indicators 80. The status indicators 80, preferably LEDs, display one or more status notifications including powered off, powered on, advertising, connected, and/or connected and authenticated. The following indication scheme may be used in connection with the status indicators which are preferably in the form of integrated LEDs in the module 20.

| Indicator | State | Definition |
|---|---|---|
| PWR | Off | Powered Off |
| | Green - Solid | Powered On |
| Status | Blue - Blinking | Advertising (not connected) |
| | Blue - Solid | Connected |
| | Green - Solid | Connected and authenticated |

The public address pause module 20 a security chip adapted to prevent rogue device pairing. The module 20 preferably includes a hardware authentication scheme using secure key/data storage methodologies. The module 20 preferably utilizes Secure Hash Algorithm (SHA) based integrated circuits to provide a crypto-authentication component that is inaccessible once installed. In addition, the module 20 preferably additionally includes a unique Bluetooth identifier 90 for secure and addressable access to the module 20.

FIG. 3 further schematically shows a power supply 95 within the module 20 that preferably includes a supply clamp 98, a EMI filter 100, and a hold up module to maintain a charge within the module 20. A DC-DC converter 107 is preferably additionally connected with respect to the power supply 95 that is fed through the connector 35 from a 28V power in 25 from the aircraft.

As described, a preferred method of operation of the onboard entertainment system 40 in the aircraft cabin includes the steps of connecting the public address pause module 20 to an aircraft public address speaker 45; detecting whether a measured voltage of the public address speaker 45 exceeds a pre-set threshold; generating a pause signal; and communicating the pause signal to the onboard entertainment system 40.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A public address pause module for an onboard entertainment system of an aircraft cabin, the module comprising:
   a connector for connecting the module to an aircraft public address speaker;
   an audio detection circuit connected with respect to the connector and configured to measure a voltage of the aircraft public address speaker;
   a micro controller unit connected with respect to the audio detection circuit to determine whether the measured voltage of the public address speaker exceeds a pre-set threshold for a pre-determined time period and to generate a pause signal; and
   a wireless transmitter for communicating the pause signal to the onboard entertainment system.

2. The public address pause module of claim 1 wherein the connector further connects to an aircraft power bus.

3. The public address pause module of claim 1 wherein at least one of the pre-set threshold and the pre-determined time period are adjustable to account for variances in aircraft type.

4. The public address pause module of claim 1 wherein the public address pause module is positioned proximate to the onboard entertainment system.

5. The public address pause module of claim 1 further comprising one or more status lights.

6. The public address pause module of claim 5 wherein the status lights show at least one of powered off, powered on, advertising, connected, and connected and authenticated.

7. The public address pause module of claim 1 further comprising a security chip adapted to prevent rogue device pairing.

8. The public address pause module of claim 1 wherein the micro controller unit comprises a Bluetooth low energy system on chip.

9. The public address pause module of claim 1 wherein the connector connects to an analog audio wire of the public address speaker and a 28V power line of the aircraft.

10. A method of operation of an onboard entertainment system in an aircraft cabin, the method comprising:
    connecting a public address pause module to an aircraft public address speaker;
    the public address pause module measuring a voltage of the public address speaker;
    detecting whether the measured voltage of the public address speaker exceeds a pre-set threshold;
    generating a pause signal; and
    communicating the pause signal to the onboard entertainment system.

11. The method of claim 10 further comprising:
    detecting whether the measured voltage of the public address speaker exceeds the pre-set threshold for a pre-determined time period.

12. The method of claim 11 further comprising:
    adjusting at least one of the pre-set threshold and the pre-determined time period to account for variances in aircraft type.

13. The method of claim 10 further comprising:
    visually indicating on the public address pause module at least one of powered off, powered on, advertising, connected, and connected and authenticated.

14. The method of claim 10 further comprising positioning the public address pause module proximate to the onboard entertainment system.

\* \* \* \* \*